United States Patent
Bach et al.

(10) Patent No.: US 11,885,384 B2
(45) Date of Patent: Jan. 30, 2024

(54) POT-SHAPED COMPOSITE BRAKE ROTOR FOR MOTOR VEHICLES

(71) Applicant: Continental Teves AG & Co. OHG, Frankfurt am Main (DE)

(72) Inventors: Uwe Bach, Niedernhausen (DE); Hans-Peter Metzen, Bad Vilbel (DE); Ahmed Sefo, Frankfurt am Main (DE); Jens Hoffmann, Darmstadt (DE); Manfred Rüffer, Sulzbach (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 195 days.

(21) Appl. No.: 17/421,849

(22) PCT Filed: Jan. 9, 2020

(86) PCT No.: PCT/EP2020/050368
§ 371 (c)(1),
(2) Date: Jul. 9, 2021

(87) PCT Pub. No.: WO2020/144251
PCT Pub. Date: Jul. 16, 2020

(65) Prior Publication Data
US 2022/0099149 A1 Mar. 31, 2022

(30) Foreign Application Priority Data

Jan. 11, 2019 (DE) ...................... 10 2019 200 261.7
Jan. 22, 2019 (DE) ...................... 10 2019 200 719.8
Sep. 10, 2019 (DE) ...................... 10 2019 213 756.3

(51) Int. Cl.
*F16D 65/12* (2006.01)
*F16D 65/10* (2006.01)
(Continued)

(52) U.S. Cl.
CPC ........... *F16D 65/10* (2013.01); *F16D 65/827* (2013.01); *F16D 2065/136* (2013.01);
(Continued)

(58) Field of Classification Search
CPC ................... F16D 65/10; F16D 65/827; F16D 2065/1316; F16D 2065/1328;
(Continued)

(56) References Cited

U.S. PATENT DOCUMENTS

| 1,553,670 A | 9/1925 | Cautley |
| 1,678,777 A | 7/1928 | Hansen et al. |

(Continued)

FOREIGN PATENT DOCUMENTS

| CN | 1334211 A | 2/2002 |
| CN | 1651792 A | 8/2005 |

(Continued)

OTHER PUBLICATIONS

Indian Office Action dated Aug. 16, 2021 for the counterpart Indian Patent Application No. 2021127018360.

(Continued)

*Primary Examiner* — Christopher P Schwartz (57) ABSTRACT

A pot-shaped composite brake rotor for motor vehicles, which combines at least one securing component as a hub interface with at least one friction ring component (as a friction partner for at least one friction lining. Distinction is made between a torque transmission function a fixing function between the paired components by the provision of a heat-conductive joint interface between the components on one side. The components are assembled coaxially with one another and joined rotationally fixedly in the axial direction so that the securing component serves as a heat sink for the friction ring component. At least one fixing element between the components is provided separately, and this fixing ele- (Continued)

ment substantially exclusively (nominal load) performs a fixing function by mutual form fit by a radially directed engagement behind at least one undercut. A press-fit connection s present for torque transmission between the securing component and the friction ring component.

12 Claims, 9 Drawing Sheets

(51) Int. Cl.
*F16D 65/827* (2006.01)
*F16D 65/02* (2006.01)

(52) U.S. Cl.
CPC ............ *F16D 2065/1316* (2013.01); *F16D 2065/1328* (2013.01); *F16D 2065/1392* (2013.01)

(58) Field of Classification Search
CPC ....... F16D 2065/136; F16D 2065/1392; F16D 65/12; F16D 65/123–128
USPC .......................................... 188/18 A, 218 XL
See application file for complete search history.

(56) References Cited

U.S. PATENT DOCUMENTS

| | | | |
|---|---|---|---|
| 1,978,563 A | | 10/1934 | Bragg |
| 2,041,776 A | | 5/1936 | Nelson |
| 2,095,719 A | | 10/1937 | Sinclair |
| 3,661,235 A | * | 5/1972 | Harrison ............... F16D 65/123 188/218 XL |
| 3,734,697 A | | 5/1973 | Sieghartner |
| 5,855,444 A | | 1/1999 | Ohlson et al. |
| 5,988,324 A | | 11/1999 | Bertetti et al. |
| 6,033,032 A | * | 3/2000 | Rutter ................. B60B 27/0094 301/105.1 |
| 6,035,978 A | | 3/2000 | Metzen et al. |
| 6,145,632 A | * | 11/2000 | Rutter .................... F16D 65/123 188/18 R |
| 6,152,270 A | * | 11/2000 | Giorgetti ............... F16D 65/128 188/218 XL |
| 6,821,022 B2 | * | 11/2004 | Brunetti ................ F16C 19/184 384/589 |
| 9,982,732 B2 | * | 5/2018 | Zhou ..................... F16D 65/123 |
| 10,655,693 B2 | * | 5/2020 | Dériaz ..................... B21H 1/02 |
| 2002/0068515 A1 | | 6/2002 | Butfering et al. |
| 2003/0121733 A1 | | 7/2003 | Niebling et al. |
| 2005/0167214 A1 | | 8/2005 | Yamamoto et al. |
| 2015/0101897 A1 | | 4/2015 | Derouault et al. |
| 2018/0187731 A1 | | 7/2018 | Drewes |
| 2018/0306259 A1 | | 10/2018 | Kokott et al. |
| 2022/0099149 A1 | | 3/2022 | Bach et al. |

FOREIGN PATENT DOCUMENTS

| | | | |
|---|---|---|---|
| CN | 104507770 A | | 4/2015 |
| CN | 204253686 U | | 4/2015 |
| CN | 206338348 U | | 7/2017 |
| CN | 108431445 A | | 8/2018 |
| DE | 846963 C | | 8/1952 |
| DE | 6943051 U | | 1/1971 |
| DE | 7121527 U | | 11/1971 |
| DE | 2134988 A1 | | 1/1972 |
| DE | 219542 A1 | | 3/1985 |
| DE | 4419754 A1 | | 12/1995 |
| DE | 19721773 A1 | | 11/1998 |
| DE | 69422404 T2 | | 8/2000 |
| DE | 69607734 T2 | | 8/2000 |
| DE | 69713730 T2 | | 10/2002 |
| DE | 69807957 T2 | | 1/2003 |
| DE | 10161719 A1 | | 6/2003 |
| DE | 10217616 A1 | | 11/2003 |
| DE | 102009044678 B4 | | 7/2010 |
| DE | 102011054484 A1 | | 4/2013 |
| DE | 102015212017 A1 | | 12/2016 |
| DE | 102017207062 A1 | | 10/2018 |
| EP | 1175961 A2 | | 1/2002 |
| EP | 1426644 A2 | * | 6/2004 ............. F16D 65/12 |
| EP | 14266444 A2 | | 6/2004 |
| KR | 100440768 B1 | | 10/2004 |
| WO | 9641967 A1 | | 12/1996 |
| WO | 9641968 A1 | | 12/1996 |
| WO | 2014160888 A1 | | 10/2014 |
| WO | 2014160889 A1 | | 10/2014 |
| WO | 2020144250 A1 | | 7/2020 |

OTHER PUBLICATIONS

DE Office Action dated Jan. 27, 2022 of counterpart DE application 10 2019 213 751.2.
DE Office Action dated Dec. 22, 2021 of counterpart DE application 10 2019 213 756.3.
CN Office Action dated Jun. 27, 2022 of counterpart CN application 202080006372.9.
Koren Office Action dated Sep. 30, 2022, in counterpart Korean Patent Application No. 10-2021-7011612.
International Search Report and the Written Opinion of the International Searching Authority dated Mar. 14, 2020 for the counterpart PCT Application No. PCT/EP2020/050368.
German Patent Application No. DE 10 2019 200 261.7, filed Jan. 11, 2019 in the name of Continental Teves AG & Co. OHG.
Chinese Second Office Action dated Mar. 22, 2023, for the counterpart Chinese Patent Application No. 202080006372.9.
European Examination Report dated Sep. 6, 2023 for the counterpart European Patent Application No. 20700870.7 and DeepL translation of same.

* cited by examiner

POT-SHAPED COMPOSITE BRAKE ROTOR FOR MOTOR VEHICLES

CROSS-REFERENCE TO RELATED APPLICATIONS

This U.S. patent application claims the benefit of PCT patent application No. PCT/EP2020/050368, filed Jan. 9, 2020, which claims the benefit of German patent application No. 10 2019 200 261.7, filed Jan. 11, 2019, German patent application No. 10 2019 200 719.8, filed Jan. 22, 2019 and German patent application No. 10 2019 213 756.3, filed Sep. 10, 2019, all of which are hereby incorporated by reference.

TECHNICAL FIELD

The invention concerns a pot-like composite brake rotor for motor vehicles, which may be provided as a multipiece assembled brake drum in multi-material technology (e.g. with pairing of components made from different materials).

BACKGROUND

DE 10 2009 044 678 B4 describes a forming process and a forming tool for producing an assembled composite brake drum for the purpose of simultaneous form-fit joining by cold-forming between two components by means of pins. The pins serve expressly as a fixing means and simultaneously inhibit rotation. To this end, a friction ring component of steel material has openings, so that a securing component in the form of an aluminium forging with pins can be inserted in the corresponding openings simultaneously by form fit and force fit. In this context, in operation of the motor vehicle, each pin is exposed to a complex, multi-axis loading because the pins must simultaneously transmit both the braking torques and also the fixing forces (directed mainly axially) between the components, with the result that the alloy material is subjected to a very high shear stress. Therefore, extremely high production precision is essential for precise and even load distribution across all pins. The performance capacity of a drum brake constructed in this way remains limited because of the unevenly divided load-bearing behavior with a very limited number of pins. This is because the installation space which can be used to accommodate the pin press punches in the production tool is necessarily restricted by a comparatively bulky central punch. In this respect, there is a need for unrestricted load-bearing capacity as far as possible, and a simplified production method.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to application DE 10 2019 200 261 A1 by the same applicant discloses a multipiece, temperature-resistant and lightweight composite brake drum which, for the purpose of reciprocal fixing of its components with mutually rotationally fixed arrangement, has a separate joint interface which is arranged radially aligned with a flange plane, and wherein separate fixing means, such as in particular several fixing elements directed axially and/or radially, are present for mutual fixing (axial direction) between the components.

A composite brake drum with the performance capacity of a disk brake of approximately the same dimensions is provided. The composite brake drum works safely, stably and reliably under extreme temperature loading, and wherein a manufacturing method is possible which allows a simple, precise, durable production with rationalized division of work over the diversified value creation chain with different material constituents.

The feature combination proposed here according to the present solution with all proposals also, by reference, relates to a combination of a securing component and a friction ring component according to patent application DE 10 2019 200 261.7, which integrates a press-fit connection configured to be self-amplifying using a separate joint/interface between the securing component and the friction ring component, with the consequence that the features in this respect are included in any combination The present embodiments are in no way directed at separate screw fixing means because the mutual fixing between the friction ring component and the securing component takes place by forming and consequently by form fit, i.e. by engagement of, for example, a cavity in, around, over or behind an undercut, by means of the interface between the securing component and the friction ring component.

Furthermore, a division of tasks between means and features for mutual component fixing, and between means and features for mutual torque transmission between the components is provided. Between the components concerned, one embodiment comprises a heat-dissipating joint so that the securing component is deliberately provided as a heat sink for the friction ring component, and wherein secondly, at least one integral fixing means is present which is definedly integrated between the components, so that this fixing means substantially exclusively (nominal load) performs a fixing function with mutual form fit and with radially directed engagement behind at least one undercut, and wherein to inhibit rotation, the press-fit connection is defined with offset separately next to this fixing means between the securing component and the friction ring component.

Therefore, an independent and integrated fixing means function is provided which defines a joint forming of the securing component and/or the friction ring component after their assembly, and wherein each fixing means substantially exclusively (rated performance level) performs a fixing function by mutual form fit. Accordingly, a fixing means is generally freed from complex stress, because it has no torque transmission tasks. This is because the secondary press-fit connection, defined separately between the securing component and friction ring component, as a torque transmission component arranged with mutual force fit, serves for rotational inhibition.

Furthermore, at least one correspondingly adapted manufacturing method which, using several method steps performed in temporal succession, contains a novel pairing and joint-forming process. The securing component and the wall component are initially paired with one another by the press-fit connection. This takes place preferably by pressing of the securing component into the friction ring component in the axial direction, or vice versa. The presented fixing by forming takes place only afterwards, separately, and its direction of action is directed largely orthogonally and transversely to the axial direction. Fixing takes place following the pressing process, i.e. chronologically after the rotational inhibition has already been ensured.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 A, B, C are enlarged top views of the embodiment of FIG. 1 showing detail X having a form-fit;

DETAILED DESCRIPTION

According to DE 10 2019 200 261.7, a composite brake drum has a given component division with radially directed joint 21 with a joint interface which is provided to be placed largely radially aligned in relation to a flange plane FE. The pairing of the interface between the securing component 2 and friction ring component 4 may have a precise press-fit connection 7 for precise true running. As a mounting aid in the region of this fit joint, also for example a chamfer, edge rounding, insertion slope profiling or similar may be provided between the components 2, 4. The given configuration of this interface may be such that material pairing includes a thermo-active cooling material such as in particular alloy (preferably extruded aluminium profile material or aluminium forging material) for the securing component 2, and a ferrous material such as for example ductile cast iron (e.g. spheroidal graphite iron) or cast steel, for the friction ring component 4. Also, the disclosed material configuration and geometry of the press-fit connection 7 allow the latter to expand uninhibitedly radially outwardly, wherein the load-bearing capacity of the press-fit connection simultaneously increases automatically with the increasing radially directed temperature expansion of the securing component 2.

Further details of a corresponding joint or stepped interface between the securing component 2 and friction ring component 4 are given in the application document included herein by reference according to DE 10 2019 200 261.7. The present invention furthermore in principle extends to pot-shaped brake rotors, so that a composite brake disk is conceivable and included, without leaving the scope of the invention.

Figure 1:
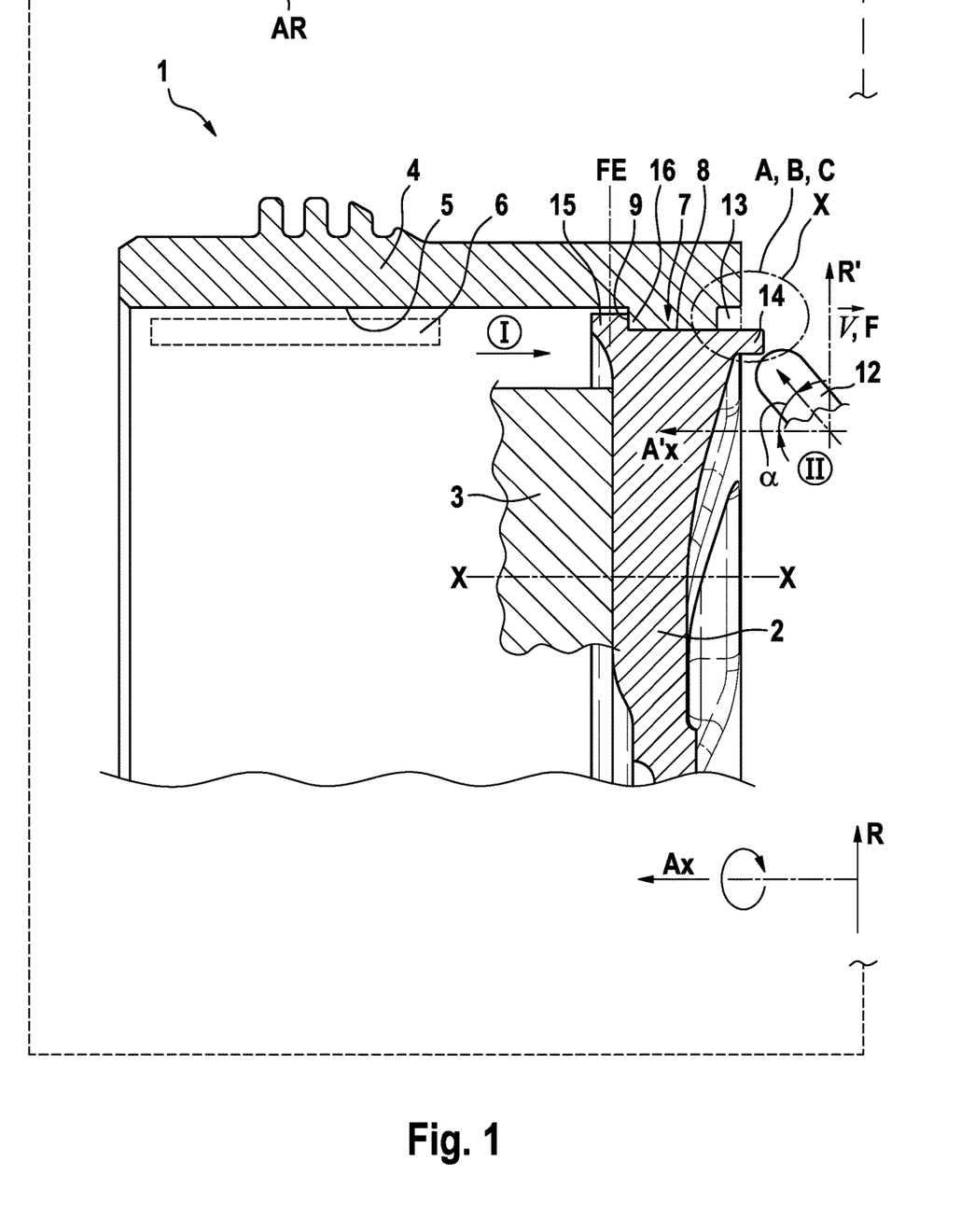
FIG. 1 illustrates an enlarged general view of a first embodiment of a composite brake rotor and manufacturing method with steps I and II) with allocated deformation zone (detail X) on the drum exterior, directed radially outward.

According to FIG. 1, a circular disk-like securing component 2 is stepped on its periphery, i.e. firstly formed with an axially directed shoulder or retaining collar 15, and on its right-hand end face (as shown in FIG. 1) in axial extension, a material reservoir/store 14 is provided in the form of a circumferential ring protrusion. This material store 14 of the ring protrusion serves to form a mutual fixing means/deformation zone X as indicated by dotted lines in FIG. 1 and described below. Firstly, by means of the circular cylindrical joint 8, there is a joined press-fit connection 7 with given surface pressure between said components 2, 4 as a rotation inhibitor. The securing component 2 is clearly directed axially in the direction of the arrow A'x into the interior of the friction ring component 4, and is inserted axially until the shoulder/retaining collar 15 on one side comes to a form-fit stop on the stop 16 arranged there. The press-fit connection 7 in the joint 8 at this time performs a function of relative rotation inhibition/torque transmission in the pairing between the securing component 2 and the friction ring component 4 (provisional axial fixing by form-fit undercut with axial stop on left).

As also evident from FIG. 1, for further axial fixing (right stop), a cavity/groove 13 is provided on the right-hand end face of the friction ring component 4. The cavity 13 serves for definitive fixing in that a radially outwardly directed plastic deformation, or forming caulking/embossing (see tool 12, press punch or press roller), is applied to the material store 14 of the ring protrusion. The overlap/form fit/undercut formed in this way supplements the fixing, and consequently prevents the securing component 2 from sliding out of the friction ring component 4 in the opposite arrow direction I (i.e. to the left in FIG. 1). Accordingly, a composite brake rotor 1 may provide an express division of work between the rotation inhibition function on one side and the fixing function on the other, in that the press-fit connection 7 substantially provides exclusively the rotation inhibition function between the components 2, 4, wherein the form-fit fixing with mutual engagement serves substantially exclusively for mutual axial fixing.

In the manufacturing process, the brake rotor blank/workpiece may have an independently controllable or regulatable and fixable rotational drive which, in mutual synchronization with a given cycle time or in coordination with an advance/tool movement/working movement $\vec{V}$ of the tool 12, can guarantee a capacity for twisting, adjustment or fixing and/or mounting of a clamped blank in a working chamber AR. For this example, e.g. a freely rotatably mounted pressing roller or a simple press punch may suffice as a tool 12, which accordingly executes the directed and controlled advance or forming movement in the direction of vector $\vec{V}$ in the working chamber AR. This may include a spatially defined angle of advance α. For rolling, however it is also possible that the blank/workpiece is clamped to be freely rotatable but otherwise fixedly mounted in the working chamber AR, wherein a rotationally driven pressing roller as a tool 12 acts on the workpiece such that the rotationally driven tool 12 transmits its rotational drive energy to the blank/workpiece for workpiece rotation.

Figure 1A:
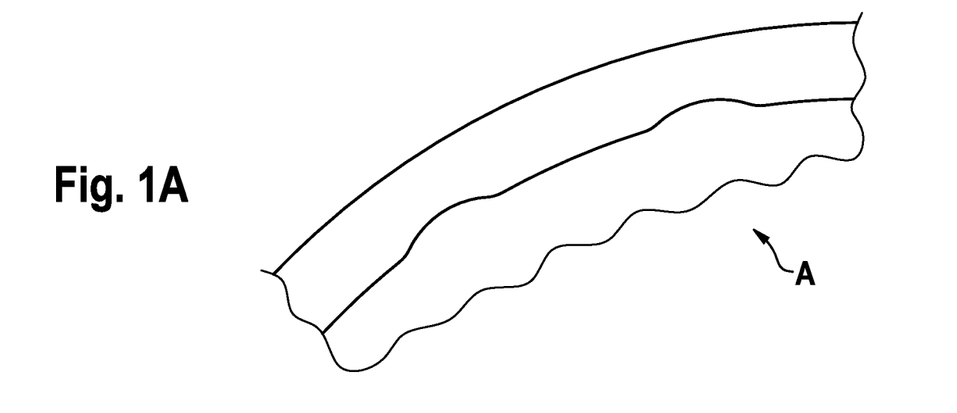
Figure 1B:
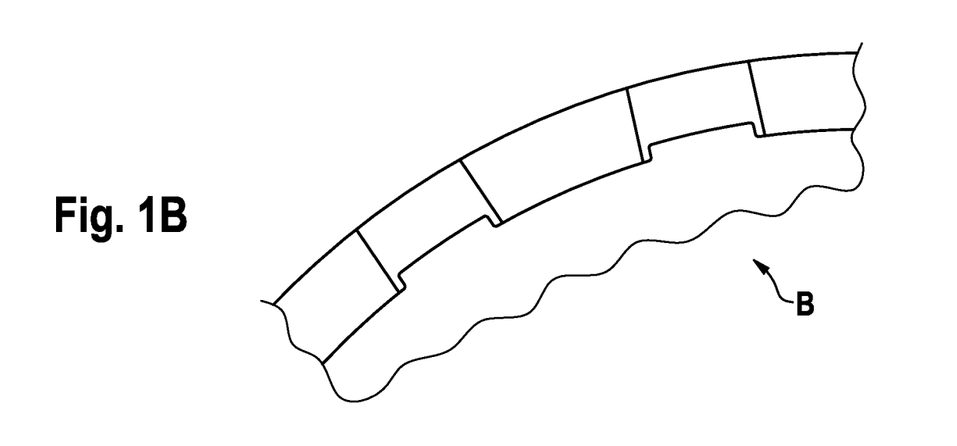
Figure 1C:
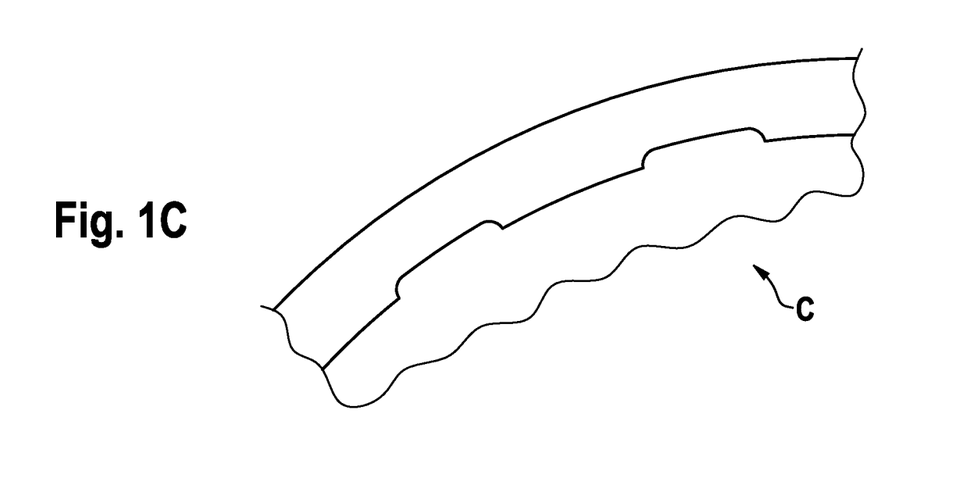

For the case of particularly high brake moments which would overload a surface pressure of the pressing joint 7 of the brake rotor 1, for the purpose of separate and additional security, the form-fit secondary additional measure of deformation zone X may also be provided. By means of the partial views of the exemplary profile details shown in part FIGS. 1A-1C, as an example such a secondary and separate form-fit rotational inhibition in the radial direction R is provided by means of the deformation zones X arranged intermittently around the periphery along the axial end face, together with radially directed engaging profile zones. FIG. 1B illustrates cam protrusions which engage in radially outwardly directed cavities of the friction ring component 4.

Figure 2:
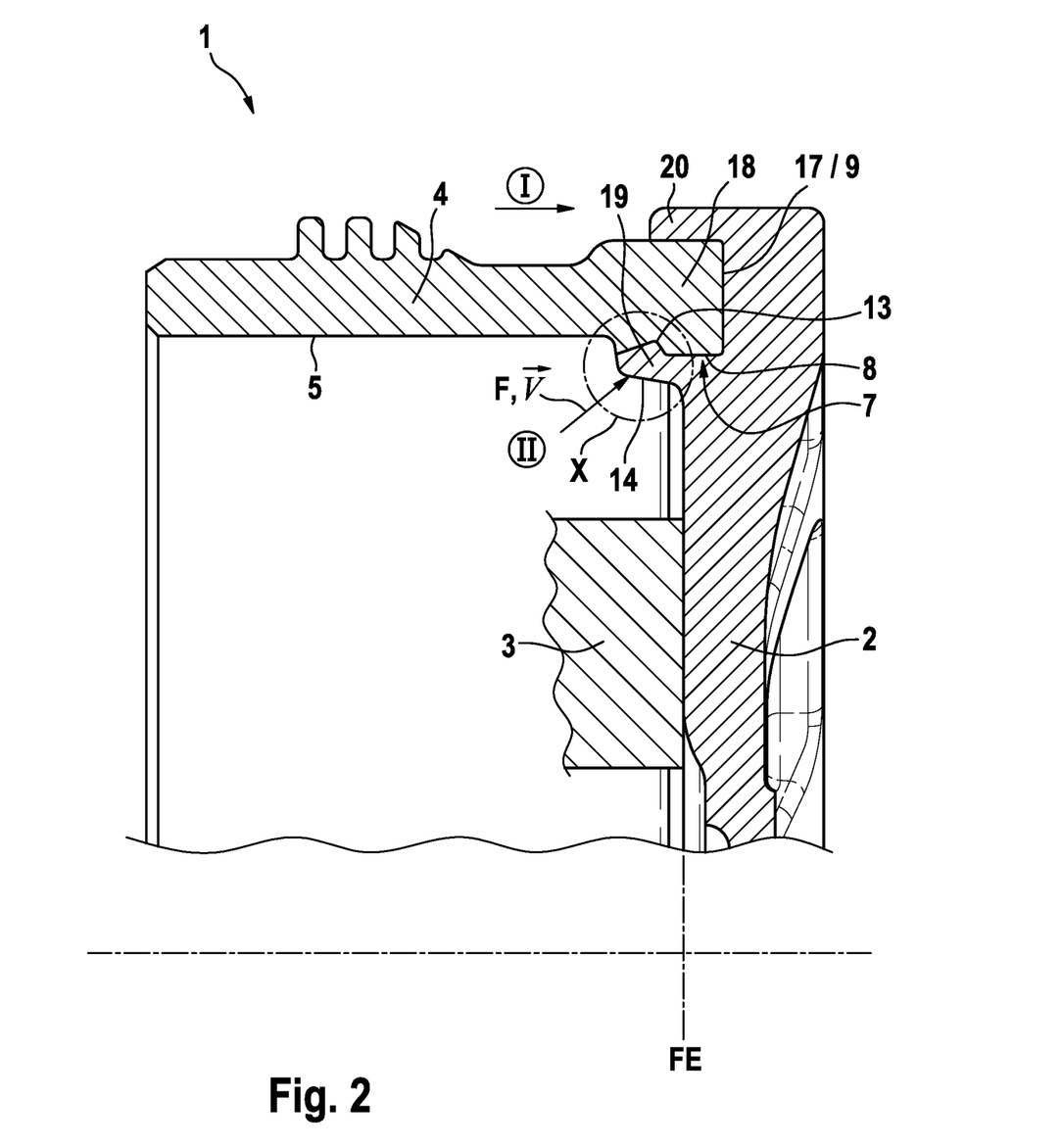
FIG. 2 is an enlarged view of a second embodiment with a deformation zone X on the drum interior, which is directed radially outward on the securing component for the purpose of fixing.

FIG. 2 illustrates another embodiment described in detail below. In this context, the securing component 2 has an axially outwardly directed ring groove receiver open on one side, namely to the left (in FIG. 2), i.e. axially outwardly directed in the insertion direction (cf. insertion process in arrow direction I, i.e. opposite the axial direction Ax), with groove base support 17 for a collar 18 and with radially inner and radially outer ring connections 19, 20. In comparison, the friction ring component 4 on its insertion end has a thicker collar 18 (shown in section as an example with rectangular cross-section) for the purpose of coupling to the securing component 2. The collar 18 is provided radially inwardly with a V-shaped cavity 13 which, in corresponding planned coordination with the later deformation zone X (process step II), may be provided intermittently with even pitch, or for example as an annular peripherally arranged groove.

Opposite this cavity 13, the securing component 2 has a radially outwardly directed, displaced deformation zone X, so that in method step II, the material from the material reservoir 14 flows/is forced/pressed into the cavity or groove 13 of the formed undercut with form fit. The deformation zone X on the blank of the securing component 2 may for example be formed as an annular peripheral ring connection 19, as indicated in dotted lines in FIG. 2. It should be noted that the radially inner ring connection 19 may be configured in the axial direction Ax with comparatively larger axial collar overlap than the radially outwardly allocated ring connection 20.

Figure 3:
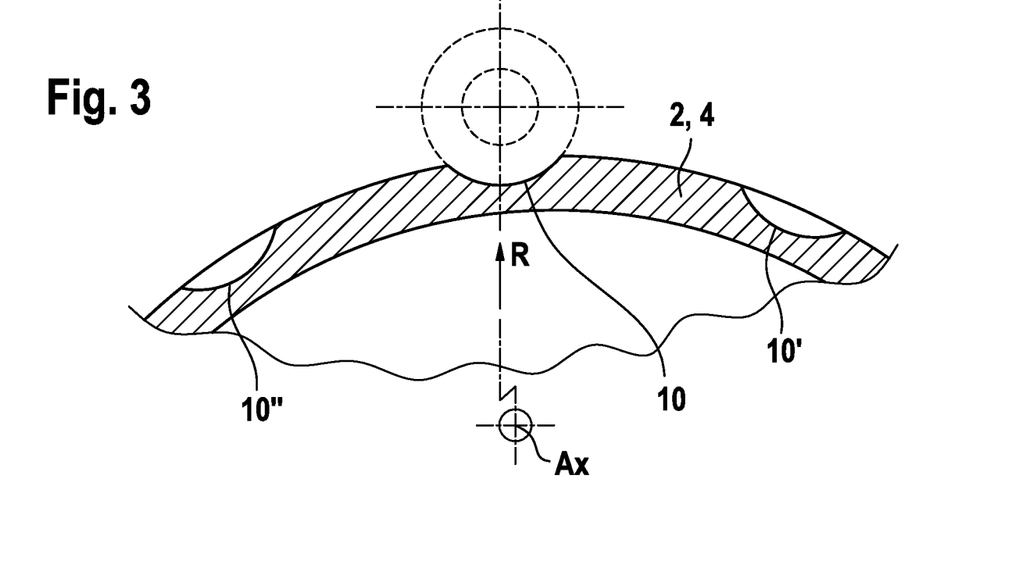
FIGS. 3 and 3a illustrate enlarged views of a third embodiment intended for a radially inwardly directed, enhanced deformation zone X/forming process, so that a cavity is directed radially inward and is open towards the radial outside and is provided for contact as an undercut on one of the components.
Figure 3A:
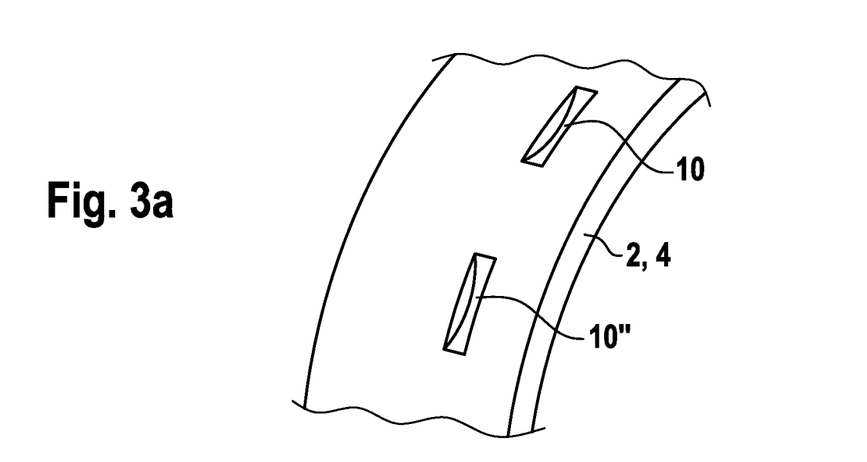

With fundamental correlation with the preceding description and extensive correlation of features, for rationalization, substantially only the decisive technical variants in FIG. 3 to FIG. 6 will be described in detail below. All variants are based on a temporally subsequent forming joining process II which is directed from radially outward to radially inward, after the provisional pairing I has been created with the press-fit connection 7. Here, the securing component 2 is in principle pressed, rolled or otherwise deformed from radially outward to radially inward. The variants shown differ primarily by the actual structure of the component interface or the form of its cavity. FIGS. 3 and 3a illustrate details of a third variant which, with a radially inwardly directed forming process II, forms a radially inwardly directed cavity at a collar end of a cylindrical friction ring component 4 from radially outward to radially inward, in the form of a crescent-shaped milling cutter groove 10, 10', 10".

Figure 4:
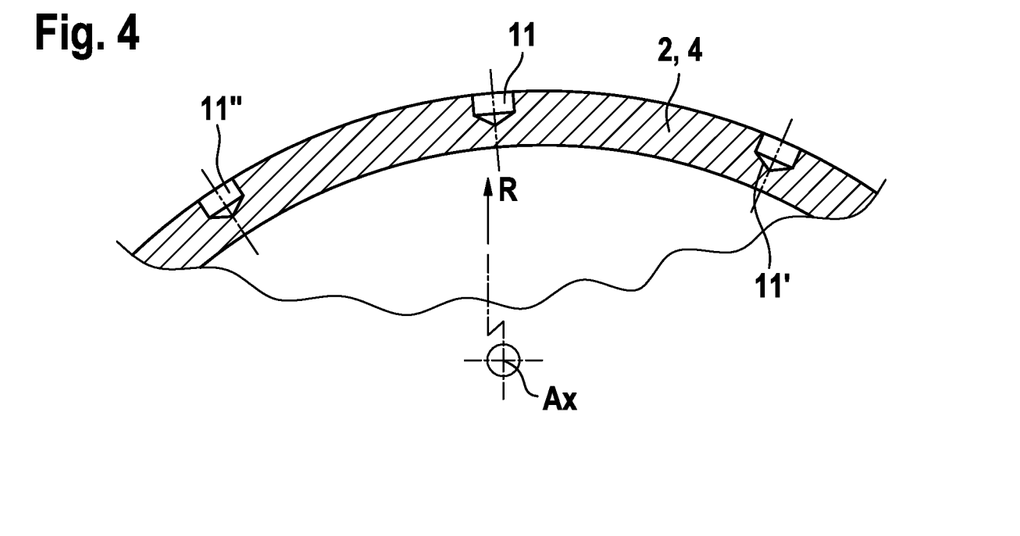
FIGS. 4 and 4a illustrate enlarged views of an alternative embodiment, comparable to FIG. 3 instead having a drilled cavity directed radially inwardly on a collar end of one of the components.
Figure 4A:
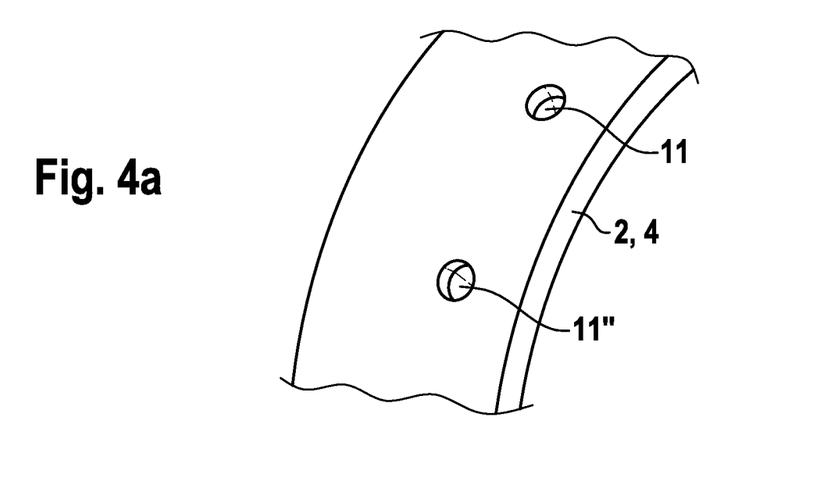
Figure 5:
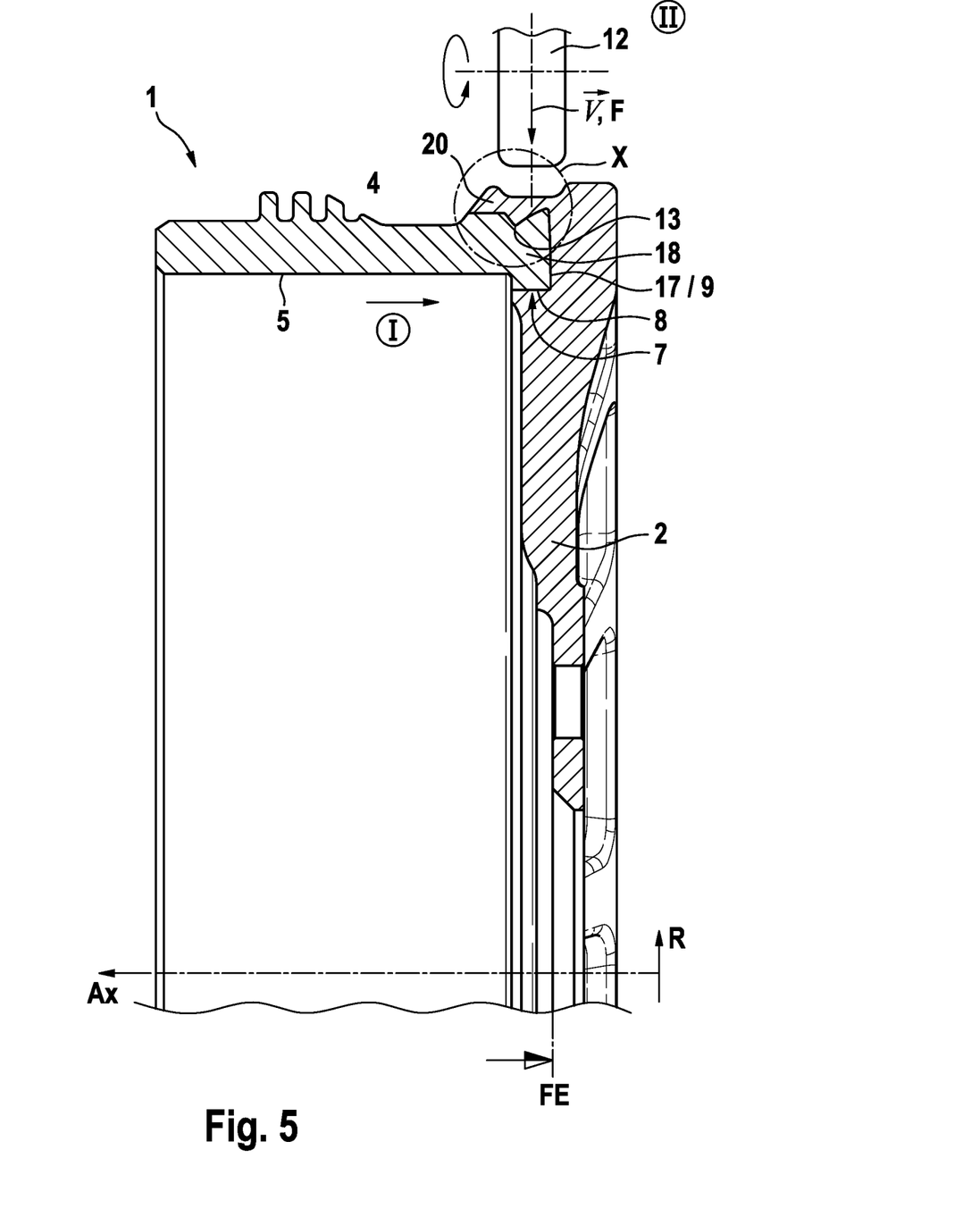
FIG. 5 a enlarged view of a partial half-section of the composite brake drum with a highlighted, radially inwardly directed deformation zone X resulting from tool 12, in connection with a groove as undercut in the friction ring component.

Similarly, FIGS. 4-4a illustrate a similar variant but with a cylindrical blind hole bore 11, 11', 11". The variant in FIG. 5 has an L-shaped cranked collar 18, wherein a cavity 13 is arranged on the radially outer periphery of the collar 18, preferably on its circumference, as a peripheral groove 13. Accordingly, the deformation zone X of the securing component 2 is arranged on the outer periphery of the securing component 2 and directed radially inwardly. The variant of the cavity 13 in FIG. 6 differs from FIG. 5 in that the cross-section of the cavity is formed as a rectangle.

Figure 6:
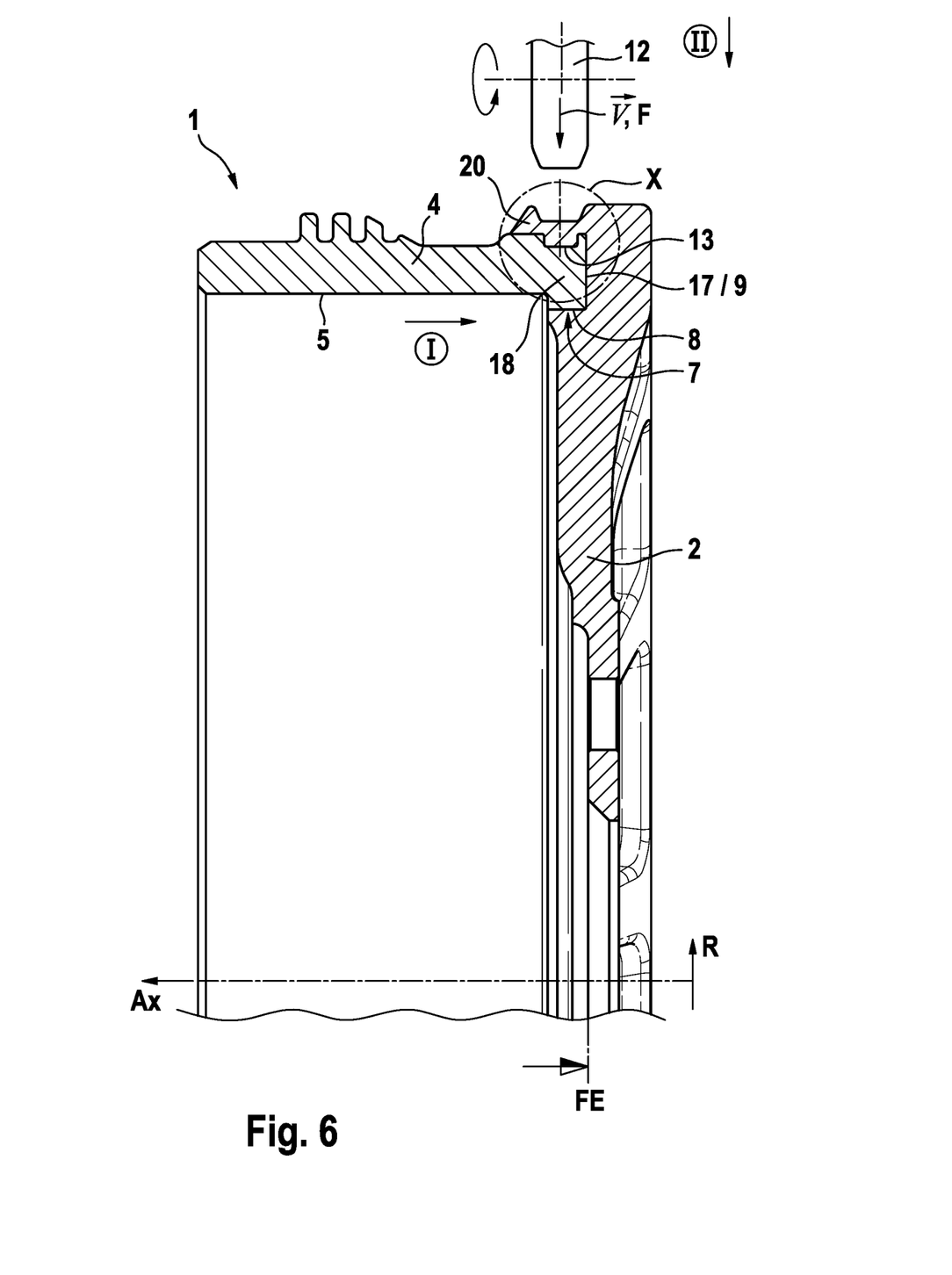
FIG. 6 illustrates an embodiment as in FIG. 5 but with a modified groove in a friction ring component.
Figure 7:
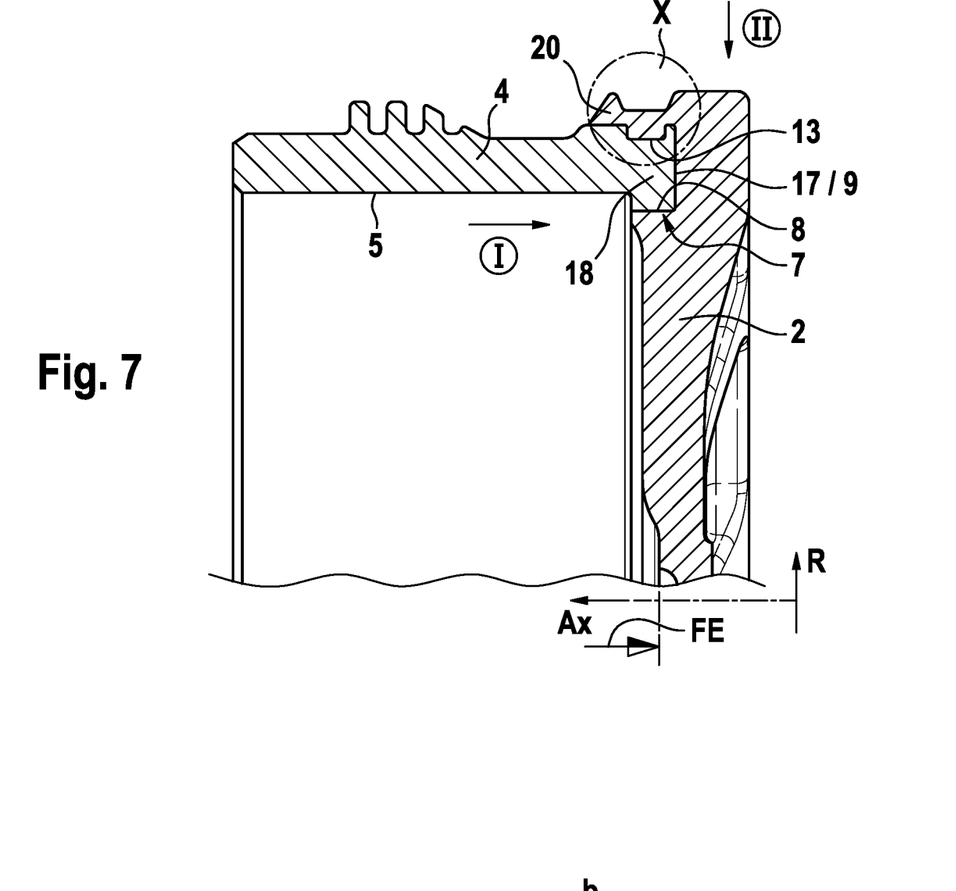
FIGS. 7 and 7a illustrate further embodiments of a groove/cavity with a wavy profile in the groove base/groove floor on a friction ring component resulting from a radially inwardly directed and varied plunging depths.
Figure 7A:
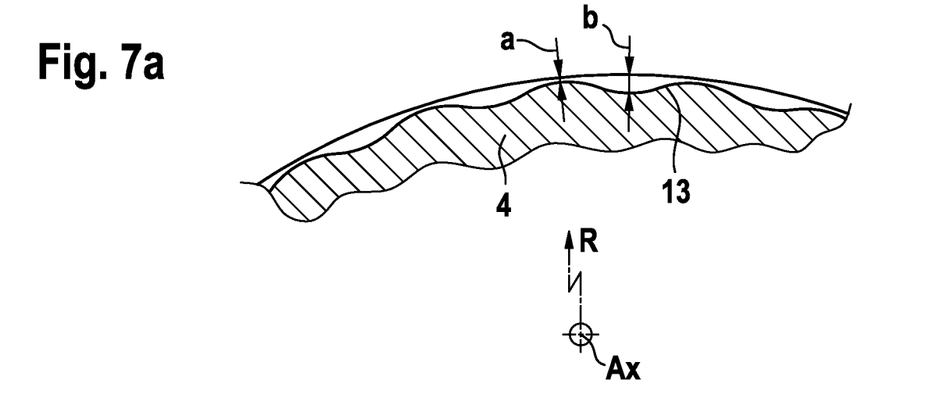

FIG. 7 substantially corresponds to the cavity in FIG. 6 with the proviso that a radial plunging depth varies between the two extreme values a, b shown. The variation may accordingly be present as a wave shape or be stepped over the periphery, as quite evident in principle from comparison with FIG. 1.

Figure 8:
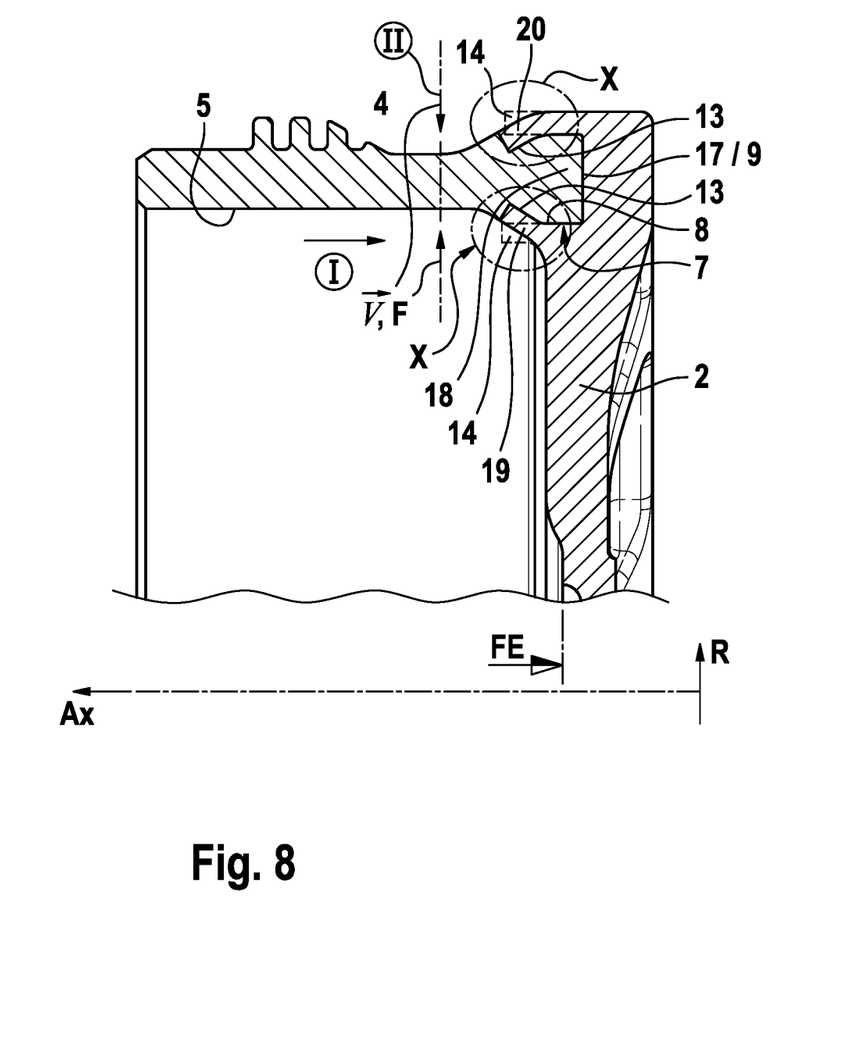
FIG. 8 illustrates a combined embodiment with double-sided enhanced deformation zone, directed radially outward, on a securing component.

Finally, FIG. 8 illustrates a combined deformation variant comprising a deformation zone X, directed both radially inwardly and radially outwardly, on the securing component 2, wherein for amplification of the form-fit undercut, the cavity 13 may be made on both sides largely mirror-symmetrically.

Finally, it is understood that all features, embodiments and variants disclosed in the application document may be combined with one another arbitrarily in many and arbitrary variations, without leaving the principle of a division of tasks/splitting of tasks between the fixing function and the torque transmission function between the components 2, 4.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A manufacturing method for a pot-shaped composite brake rotor comprising:
    forming at least one fixing element on a securing component;
    defining a deformation zone on one of the at least one fixing element and a friction ring component;
    defining a cavity on the other of the at least one fixing element and the friction ring component;
    engaging a press-fit connection between the securing component and the friction ring component by axially moving at least one of the securing component and the friction ring component, wherein the press-fit connection rotationally fixes the securing component and the friction ring component to one another;
    joining the securing component and the friction ring component with the at least one fixing element by forming the at least one fixing element in the deformation zone subsequent to engaging the press-fit connection;
    one of: a pressing and a rolling process by one of: forcing a tool in a working chamber in a direction of a rotationally driven workpiece and forcing the workpiece in the direction of the tool; and
    in the working chamber:
        rotating the workpiece about a centrally arranged rotational axis parallel to the axial direction of the friction component and securing component for rotational movement;

mounting the tool in the working chamber to be movably guided in all directions; and arranging the tool with defined spatial angle relative to the workpiece and physically orientable relative to the rotational axis.

2. The manufacturing method for a pot-shaped composite brake rotor as claimed in claim 1, controlling the working chamber, tool and workpiece movements electronically with microprocessor, such that the working chamber, tool and workpiece movements are regulated with at least one of a given cycle time and cycle frequency.

3. The manufacturing method for a pot-shaped composite brake rotor as claimed in claim 2, controlling the working chamber, tool and workpiece movements are matched to one another.

4. The manufacturing method for a pot-shaped composite brake rotor as claimed in claim 3, controlling the working chamber, tool and workpiece movements further comprises regulating mutual synchrony by at least one of a given cycle time and cycle frequency.

5. The manufacturing method for a pot-shaped composite brake rotor as claimed in claim 1, wherein engaging the press-fit connection further comprises pressing at least one of the securing component and the friction ring component axially relative to one another to achieve a mutual axial overlap; and wherein joining the securing component and the friction ring component further comprises directing a deformation of the at least one fixing element in the deformation zone transversely to the axial direction to form a form-fit connection between the at least one fixing element and a joined undercut.

6. The manufacturing method for a pot-shaped composite brake rotor as claimed in claim 1, wherein defining the at least one deformation zone further comprises defining a plurality of deformation zones which one of: run a periphery of the at least one fixing element, run a periphery of the friction ring, run a periphery of the at least one fixing element and are offset relative to one another, run a periphery of the friction ring and are offset relative to one another.

7. The manufacturing method for a pot-shaped composite brake rotor as claimed in claim 1, wherein the forming is a cold-forming process.

8. The manufacturing method for a pot-shaped composite brake rotor as claimed in claim 1, wherein the tool is one of: a punch, a pressing tool, and a rolling tool.

9. The manufacturing method for a pot-shaped composite brake rotor as claimed in claim 1, wherein the forming further comprises the tool acting on at least one of the friction ring component and the securing components with a defined oriented working movement and a defined forming force.

10. The manufacturing method for a pot-shaped composite brake rotor as claimed in claim 1, wherein during the forming the tool is mounted fixedly in the working chamber and wherein the workpiece is guided in an advance movement with a defined force in coordination of the workpiece.

11. The manufacturing method for a pot-shaped composite brake rotor as claimed in claim 1, further comprising forming in the deformation zone in the radial direction is at least one of: from radially inward to radially outward on the composite brake rotor; and from radially outward to radially inward on the composite brake rotor.

12. A brake rotor comprising:
a hub interface comprising:
an axially directed retaining collar formed at a periphery of the hub interface; and
a circumferential ring protrusion formed in axial extension at the periphery of the hub interface on an end face of the hub interface; and
a friction ring, the friction ring comprising:
a joint configured to form a press-fit connection with the end face of the hub interface;
a stop arranged at an interior end of the joint, the stop configured to provide a form-fit stop against the axially directed retaining collar; and
a groove arranged at an exterior end of the joint, the groove configured to receive the circumferential ring protrusion fixed within the groove.

* * * * *